United States Patent
Kessel et al.

(10) Patent No.: US 11,468,124 B2
(45) Date of Patent: Oct. 11, 2022

(54) COMMUNITY GENERATION BASED ON A COMMON SET OF ATTRIBUTES

(71) Applicant: NETAPP, INC., Sunnyvale, CA (US)

(72) Inventors: Omri Kessel, Waban, MA (US);
Shailaja Kamila, Bangalore, IN (US);
Pratyush Uppuluri, Bangalore, IN (US);
Jayanta Basak, Bangalore, IN (US)

(73) Assignee: NETAPP, INC., San Jose, CA (US)

( * ) Notice: Subject to any disclaimer, the term of this patent is extended or adjusted under 35 U.S.C. 154(b) by 520 days.

(21) Appl. No.: 16/297,527

(22) Filed: Mar. 8, 2019

(65) Prior Publication Data

US 2020/0233906 A1     Jul. 23, 2020

(30) Foreign Application Priority Data

Jan. 21, 2019   (IN) .............................. 201941002412

(51) Int. Cl.
     *G06F 16/906*        (2019.01)
(52) U.S. Cl.
     CPC .................................. *G06F 16/906* (2019.01)
(58) Field of Classification Search
     CPC .. G06F 16/906; G06F 16/24568; G06F 16/27; G06F 16/2255; G06F 7/08
     USPC ......................................................... 707/737
     See application file for complete search history.

(56) References Cited

U.S. PATENT DOCUMENTS

2019/0349894 A1 * 11/2019 Pai ..................... H04W 72/1247
2020/0097580 A1 *  3/2020 Nayak ................. G06F 16/2336

OTHER PUBLICATIONS

Tammy Cannon, How to Use Facebook Groups for Business: A Guide for Marketers, Social Media Examiner, Jul. 24, 2017, https://www.socialmediaexaminer.com/facebook-groups-for-business-how-to-guide-for-marketers/ (Year: 2017).*
Gennie Gebhart, Understanding Public, Closed, and Secret Facebook Groups, Electronic Frontier Foundation, Jun. 13, 2017, https://www.eff.org/deeplinks/2017/06/understanding-public-closed-and-secret-facebook-groups (Year: 2017).*

* cited by examiner

*Primary Examiner* — Allen S Lin
(74) *Attorney, Agent, or Firm* — Haynes and Boone, LLP

(57) ABSTRACT

A system, method, and machine-readable storage medium for forming a community based on a common set of attributes are provided. In some embodiments, the method includes creating a list of entities associated with a plurality of users, each entity included in the list of entities being accessed by a user of the plurality of users. The method also includes identifying a first entity accessed by a group of users of the plurality of users. The method further includes determining a first set of entities accessed by each user of the group of users, the first set of entities being included in the list of entities. The method also includes removing the first entity and the first set of entities from the list of entities. The method further includes forming a first community including the group of users, the first entity, and the first set of entities.

17 Claims, 7 Drawing Sheets

600

| Community 602 |
|---|
| Community Name: Community 602<br>Users: User1, User2, User3<br>Files: File2, File7 |

| Community 604 |
|---|
| Community Name: Community 604<br>Users: User2, User3, User4<br>Files: File9 |

| Community 606 |
|---|
| Community Name: Community 606<br>Users: User2, User3<br>Files: File10, File3 |

| Community 608 |
|---|
| Community Name: Community 608<br>Users: User3, User4<br>Files: File5 |

COMMUNITY GENERATION BASED ON A COMMON SET OF ATTRIBUTES

CROSS REFERENCE TO RELATED APPLICATIONS

The present application claims priority to and the benefit of the India Patent Application No. 201941002412 filed Jan. 21, 2019 which is hereby incorporated by reference in its entirety as if fully set forth below and for all applicable purposes.

TECHNICAL FIELD

The present description relates to detecting and generating communities of users based on entity access patterns, and more specifically, to a system, method, and machine-readable storage medium for detecting and generating communities of users based on a common set of entities stored in a distributed storage system for, e.g., cost savings, data security, and/or cost management.

BACKGROUND

Networks and distributed storage allow data and storage space to be shared between devices located anywhere a connection is available. These implementations may range from a single machine offering a shared drive over a home network to an enterprise-class cloud storage array with multiple copies of data distributed throughout the world. Improvements in distributed storage have given rise to a cycle where applications demand increasing amounts of data delivered with reduced latency, greater reliability, and greater throughput.

Operational teams across enterprise organizations face the challenge of handling data that is ever increasing in size and spread across a mix of on-premise and cloud-based data sources and ensuring that their data is secure. For understanding complex systems with large amounts of data and users, communities may be formed. Historically, a community has corresponded to groups of nodes in a graph (e.g., network depicted as graph), e.g., a set of nodes that is more densely connected to each other than the rest of the network nodes. A popular use of communities is a social network in which users connect with each other, and community extraction in social networks results in connected subgraphs (e.g., social circles). In an example, the Girvan-Newman algorithm (GN algorithm) detects communities by progressively removing edges from the original network, and the connected components of the remaining network form the communities. Over time, many variations and extensions to the GN algorithm have been developed to improve computational complexity.

Current approaches, however, do not take into account the actual attributes that are common to the nodes when detecting and generating communities. Rather, current approaches are limited in that they focus only on the connections between nodes.

BRIEF DESCRIPTION OF THE DRAWINGS

The present disclosure is best understood from the following detailed description when read with the accompanying figures.

DETAILED DESCRIPTION

Figure 1:
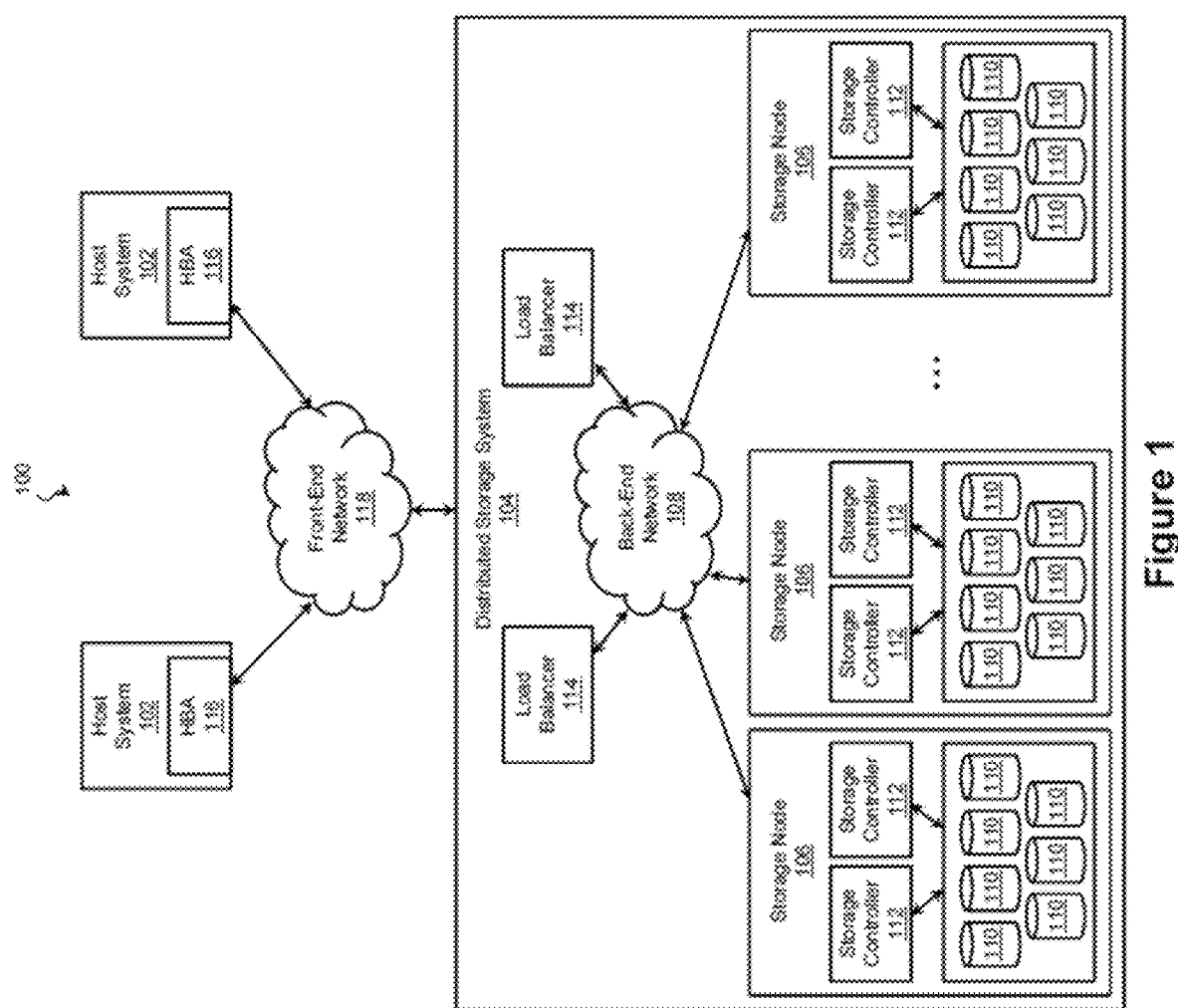
FIG. 1 is a schematic diagram of a computing architecture according to aspects of the present disclosure.

All examples and illustrative references are non-limiting and should not be used to limit the claims to specific implementations and embodiments described herein and their equivalents. For simplicity, reference numbers may be repeated between various examples. This repetition is for clarity only and does not dictate a relationship between the respective embodiments, unless noted otherwise. Finally, in view of this disclosure, particular features described in relation to one aspect or embodiment may be applied to other disclosed aspects or embodiments of the disclosure, even though not specifically shown in the drawings or described in the text.

Operational teams across enterprise organizations face the challenges of handling a vast amount of data stored in different data storage centers and spread across a mix of on-premise and cloud-based data sources. The amount of data stored and handled by enterprise organizations continues to grow. An enterprise organization may have many departments, with users in the same departments typically accessing the same files as each other. For example, employees in the Human Resources (HR) department tend to access the same files as each other. In another example, engineers working on the same project tend to access the same files as each other.

An entity represents any arbitrary unit of data regardless of whether it is organized as an object, a file, a directory, or a set of blocks. It may be desirable to track and identify usage patterns of users to detect anomalies based on membership in communities. A community may be defined as including a set of users (e.g., in an organization) who have accessed a common set of entities (e.g., files, directories, objects, etc. according to embodiments of the present disclosure) over a defined time-period.

The present disclosure provides techniques for detecting and generating communities of users based on entity access patterns. In an example, a community detection system may form communities by detecting and generating communities of users based on a common set of entities stored in a distributed storage system for, e.g., cost savings, data security, and/or cost management. In an example, the community detection system obtains a list of entities associated with a plurality of users. At least one user of the plurality of users has accessed an entity in the list of entities. From the list of entities, the community detection system may select an entity and use the selected entity as an "anchor" for forming a community. In an example, the selected entity has the greatest number of distinct users who have accessed the entity.

The community detection system may determine a first set of entities accessed by each user of the group of users. The first set of entities is included in the list of entities. Accordingly, each entity of the first set of entities has been accessed by each user of the group. The community detection system forms a first community including the group of users, the selected entity, and the first set of entities. Accordingly, each of the users in the first community has accessed each of the entities included in the same community, providing a tight and cohesive relationship between the users and entities included in the same community. The community detection system may remove the selected entity and the first set of entities from the list of entities and perform similar actions to form another community.

For example, the community detection system may form a second community including a second group of users, a second entity, and a second set of entities. The second entity and the second set of entities are included in the list of entities and have not been removed based on formation of the first community above. The second set of entities has been accessed by the second group of users of the plurality of users. Additionally, communities may overlap such that users are common to various communities. For example, a user may be included in both the first and the second communities. Additionally, the first set of entities and the second set of entities may be disjoint because before the second community is formed, the first set of entities is removed from the list of entities. The community detection system may continue to perform these actions until the list of entities is empty.

The community detection system may use various parameters in relation to formation of communities. In some examples, the community detection system may use an entity-overlap parameter when forming a community. The entity-overlap parameter may be tuned to allow a degree of overlap between entities commonly accessed by users of respective communities. In an example if the entity-overlap parameter is zero, no overlap between entities commonly accessed by users of respective communities is allowed. In some examples, the community detection system may use a reduction module setting that may be set to an ON mode or an OFF mode when forming a community. If the reduction module is set to ON, the community formation engine may reduce the number of communities by stricter adherence to one or more principles discussed in the disclosure. In some examples, the community detection system may use a heuristic when forming a community. The community detection system 210 may use heuristics to reduce redundancies and the number of communities formed, as will be explained in more detail in the disclosure.

After one or more communities are formed, a system may consider the community to which a user belongs as a baseline that provides insight into other users' activities (e.g., for use in detecting anomalous use). For example, if a user belonging to a community has increased her access rates for a given set of files and other users belonging to the same community have also increased their access rates for the given set of files, it may be determined that the user's behavior is not suspicious, given the access rates of other users in the community. If, however, only the user's access increases without a proportional increase in other users' access rates, the user's behavior may be flagged as suspicious. By using communities in such a way, the individual user's behavior may more accurately be put in context relative to other users in the same community. In other words, each individual user may have varied access rates (e.g., high, low, or medium, etc.), but as the collective behavior of a community (that a given user is a part of) changes (e.g., all users in the community have increased their access rates), it may be determined that the behavior is not suspicious behavior.

FIG. 1 is a schematic diagram of a computing architecture 100 according to aspects of the present disclosure. The computing architecture 100 includes one or more host systems 102 (hosts), each of which may interface with a distributed storage system 104 to store and manipulate data. The distributed storage system 104 may use any suitable architecture and protocol. For example, in some embodiments, the distributed storage system 104 is a StorageGRID system, an OpenStack Swift system, a Ceph system, or other suitable system. The distributed storage system 104 includes one or more storage nodes 106 over which the data is distributed. The storage nodes 106 are coupled via a back-end network 108, which may include any number of wired and/or wireless networks such as a Local Area Network (LAN), an Ethernet subnet, a PCI or PCIe subnet, a switched PCIe subnet, a Wide Area Network (WAN), a Metropolitan Area Network (MAN), the Internet, or the like. In some exemplary embodiments, the storage nodes 106 are coupled by a TCP/IP back-end network 108, which is local to a rack or datacenter, although additionally or in the alternative, the network 108 may extend between sites in a WAN configuration or be a virtual network extending throughout a cloud. The storage nodes 106 may be as physically close or as widely dispersed as the application may warrant. In some examples, the storage nodes 106 are housed in the same racks. In other examples, storage nodes 106 are located in different facilities at different sites anywhere in the world. The node arrangement may be determined based on cost, fault tolerance, network infrastructure, geography of the hosts, and other considerations.

In the illustrated embodiment, the computing architecture 100 includes a plurality of storage nodes 106 in communication with a plurality of hosts 102. It is understood that for clarity and ease of explanation, only limited number of storage nodes 106 and hosts 102 are illustrated, although the computing architecture 100 may include any number of hosts 102 in communication with a distributed storage system 104 containing any number of storage nodes 106. An exemplary storage system 104 receives data transactions (e.g., requests to read and/or write data) from the hosts 102 and takes an action such as reading, writing, or otherwise accessing the requested data so that storage devices 110 of the storage nodes 106 appear to be directly connected (local) to the hosts 102. This allows an application running on a host 102 to issue transactions directed to the data of the distributed storage system 104 and thereby access this data as easily as it can access data on storage devices local to the host 102. In that regard, the storage devices 110 of the distributed storage system 104 and the hosts 102 may include hard disk drives (HDDs), solid state drives (SSDs), storage class memory (SCM), RAM drives, optical drives, and/or any other suitable volatile or non-volatile data storage medium. Further, one or more of the storage nodes 106 may be connected to one or more cloud storage providers according to embodiments of the present disclosure, and likewise appear to be directly connected (local) to the hosts 102.

With respect to the storage nodes 106, an exemplary storage node 106 contains any number of storage devices 110 in communication with one or more storage controllers 112. The storage controllers 112 exercise low-level control over the storage devices 110 in order to execute (perform) data transactions on behalf of the hosts 102, and in so doing, may group the storage devices for speed and/or redundancy using a protocol such as RAID (Redundant Array of Independent/Inexpensive Disks). The grouping protocol may also provide virtualization of the grouped storage devices 110. Virtualization includes mapping physical addresses of the storage devices into a virtual address space and presenting the virtual address space to the hosts 102, other storage nodes 106, and other requestors. In this way, the storage node 106 represents the group of devices as a single device, often referred to as a volume. Thus, a requestor can access data within a volume without concern for how it is distributed among the underlying storage devices 110.

Further, an exemplary storage node 106 may be connected to one or more cloud storage providers of varying levels (e.g., standard cloud storage or lower-class cloud storage, or both, for example S3 or GLACIER storage classes). The cloud storage node 106 may exercise protocol-level control over the allocated cloud storage space available to it on behalf of the hosts 102. Such control may be via one or more protocols such as HTTP, HTTPS, etc.

In addition to storage nodes, the distributed storage system 104 may include ancillary systems or devices (e.g., load balancers 114). For example, in some embodiments, a host 102 may initiate a data transaction by providing the transaction to a load balancer 114. The load balancer 114 selects one or more storage nodes 106 to service the transaction. When more than one alternative is possible, the load balancer 114 may select a particular storage node 106 based on any suitable criteria including storage node load, storage node capacity, storage node health, network quality of service factors, and/or other suitable criteria. Upon selecting the storage node(s) 106 to service the transaction, the load balancer 114 may respond to the host 102 with a list of the storage nodes 106 or may forward the data transaction to the storage nodes 106. Additionally, or in the alternative, a host 102 may initiate a data transaction by contacting one or more of the storage nodes 106 directly rather than contacting the load balancer 114.

Turning now to the hosts 102, a host 102 includes any computing resource that is operable to exchange data with the distributed storage system 104 by providing (initiating) data transactions to the distributed storage system 104. In an exemplary embodiment, a host 102 includes a host bus adapter (HBA) 116 in communication with the distributed storage system 104. The HBA 116 provides an interface for communicating, and in that regard, may conform to any suitable hardware and/or software protocol. In various embodiments, the HBAs 116 include Serial Attached SCSI (SAS), iSCSI, InfiniBand, Fibre Channel, and/or Fibre Channel over Ethernet (FCoE) bus adapters. Other suitable protocols include SATA, eSATA, PATA, USB, and FireWire. In many embodiments, the host HBAs 116 are coupled to the distributed storage system 104 via a front-end network 118, which may include any number of wired and/or wireless networks such as a LAN, an Ethernet subnet, a PCI or PCIe subnet, a switched PCIe subnet, a WAN, a MAN, the Internet, or the like. To interact with (e.g., read, write, modify, etc.) remote data, the HBA 116 of a host 102 sends one or more data transactions to the load balancer 114 or to a storage node 106 directly via the front-end network 118. Data transactions may contain fields that encode a command, data (i.e., information read or written by an application), metadata (i.e., information used by a storage system to store, retrieve, or otherwise manipulate the data such as a physical address, a logical address, a current location, data attributes, etc.), and/or any other relevant information.

While the load balancers 114, storage nodes 106, and the hosts 102 are referred to as singular entities, a storage node 106 or host 102 may include any number of computing devices and may range from a single computing system to a system cluster of any size. Accordingly, each load balancer 114, storage node 106, and host 102 includes at least one computing system, which in turn includes a processor such as a microcontroller or a central processing unit (CPU) operable to perform various computing instructions. The computing system may also include a memory device such as random access memory (RAM); a non-transitory computer-readable storage medium such as a magnetic hard disk drive (HDD), a solid-state drive (SSD), or an optical memory (e.g., CD-ROM, DVD, BD); a video controller such as a graphics processing unit (GPU); a communication interface such as an Ethernet interface, a Wi-Fi (IEEE 802.11 or other suitable standard) interface, or any other suitable wired or wireless communication interface; and/or a user I/O interface coupled to one or more user I/O devices such as a keyboard, mouse, pointing device, or touchscreen.

As described above, the storage system 104 may distribute the hosts' data across the storage nodes 106 for performance reasons as well as redundancy. The distributed storage system 104 is an object-based data system. The storage system 104 may be a distributed object store that spans multiple storage nodes 106 and sites. Object-based data systems provide a level of abstraction that allows data of any arbitrary size to be specified by an object identifier. Object-level protocols are similar to file-level protocols in that data is specified via an object identifier that is eventually translated by a computing system into a storage device address. However, objects are more flexible groupings of data and may specify a cluster of data within a file or spread across multiple files. Object-level protocols include CDMI, HTTP, SWIFT, and S3.

An entity represents any arbitrary unit of data regardless of whether it is organized as an object, a file, a directory, or a set of blocks. Enterprise data is spread across hybrid data sources. Entities may be stored in the distributed storage system 104 and accessed by users. To secure the data, it may be desirable to track the data usage patterns for each user. For example, if a user accesses an entity, this event may be logged in a community detection system. A community may be defined as including a set of users (e.g., in an organization) who have accessed a common set of entities (e.g., files, directories, objects, etc. according to embodiments of the present disclosure) over a defined time-period. Accordingly, users of a community have a set of common attributes (e.g., accessed a common set of entities).

A community may adhere to one or more principles. A first principle may be that communities that are formed are based on a common set of attributes (e.g., common set of entities accessed by users). Accordingly, the communities are formed based on actual entities access by the users, and not based on connectivity between users quantified by a metric. A second principle may be that a user may belong to multiple communities. Accordingly, communities may be overlapping as users are common to various communities. A third principle may be that the number of communities to be formed need not be determined a priory. A fourth principle may be that the community formation is deterministic. For example, given the same input (e.g., entity access patterns), the same communities are generated. A fifth principle may be that a community may be formed and updated in real-time in accordance with users' access of entities stored in the distributed storage system 104. A sixth principle may be that the steps performed for forming a community are computationally efficient.

Figure 2:
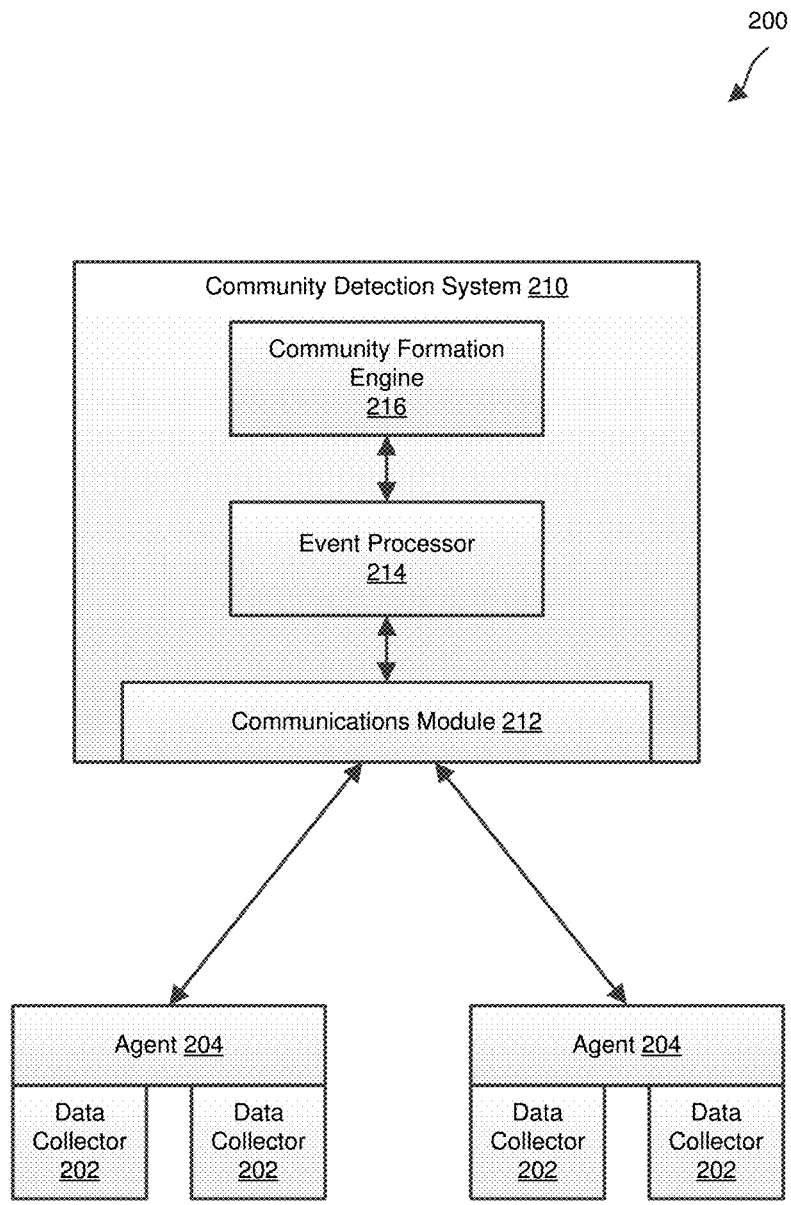
FIG. 2 is a schematic diagram of a computing architecture according to aspects of the present disclosure.

FIG. 2 is a schematic diagram of a computing architecture 200 according to aspects of the present disclosure. For example, the computing architecture 200 may be, in some examples, implemented as part of the distributed storage system 104. The computing architecture 200 includes a community detection system 210 that protects data from malicious use due, e.g., to insider threats or compromised users (to name just a few examples). The community detection system 210 interacts with one or more data collectors 202 via an agent 204. In an example, the community detection system 210 is implemented as a server or other computing device executing software code to perform the functionality described herein. Continuing with the example, community detection system 210 may be coupled to the back-end network 108 in FIG. 1 and may detect communities of users from entity access patterns by the users. The entities may be stored in the storage devices 110 of the storage nodes 106 in FIG. 1 and accessed by the users. The usage of the data stored in the storage devices 110 may be tracked by the one or more data collectors 202 shown in FIG. 2. The data collectors 202 may be incorporated into the storage node 106 and track the data usage of the entities stored in the storage devices 110, or may be separate from and communicate with the storage node 106 with regard to usage of data stored in the storage devices 110. In an example, the data collectors 202 track data usage patterns in real-time and stream the event notifications to the community detection system 210. An event may be an access by a user to an entity such as a file, directory, or other object. The data collectors 202 may send access information including one or more event notifications to the community detection system 210 via an agent 204. The agent 204 may include servers or other computing devices coupled to the back-end network 108 in FIG. 1 that transmit communications to a communication module 212 included in the community detection system 210. The agent 204 receives the event notifications, where a notification may be of the form {User "X" performed an entity access operation "O" on entity "E" at time "T" from an Internet Protocol (IP) address "IP_Addr"} (by way of example). The data collectors 202 may collect data in a "bucket" into overlapping time-periods suitable for community detection. This is a configurable option with a default time-period (e.g., as just one example, 7 days with a one-hour advancement in terms of sliding time windows). For the specified time-period, the data is analyzed to determine the group of users and the set of entities they have accessed in that time-period respectively.

Different data collectors 202 may provide different formats for their notifications, and the agent 204 receiving the notification may be specific to a particular database and normalize the event notifications into a common format such that the community detection system 210 understands the event. The agent 204 may be an orchestrator or wrapper that streams event notifications to a centralized layer from multiple data collectors. In some examples, the agents 204 stream the event notifications to the community detection system 210 in real-time.

The community detection system 210 includes a communications module 212, an event processor 214, and a community formation engine 216. The community detection system 210 may act as a centralized system that analyzes the access information and is hosted as a Software as a Service (SaaS). The community detection system 210 analyzes the event notifications irrespective of the data source type, for example as facilitated by the agents 204 normalizing the notifications.

The agent 204 sends the notifications to the communications module 212, which passes the access information along to the event processor 214. The communications module 212 receives the notifications from different data sources using data collectors 202 written specifically for heterogenous data source types. In an example, the event processor 214 is a raw event data processor that processes the access information to determine a common set of entities accessed by different users. The event processor 214 uses the data collected from various data sources that allow access to entities by users. The event processor 214 determines, based on the data collected from the various data sources, relationships between the entities and the users.

The community formation engine 216 processes the data provided by the event processor 214 (e.g., the determined relationships between the entities and the users) to identify usage patterns among a group of users and to form communities based on a common set of attributes shared by users. The community formation engine 216 may report on various compliance and regulations with respect to data usage. Further aspects of the computer architecture 200 are discussed with respect to the additional figures below.

Figure 3:
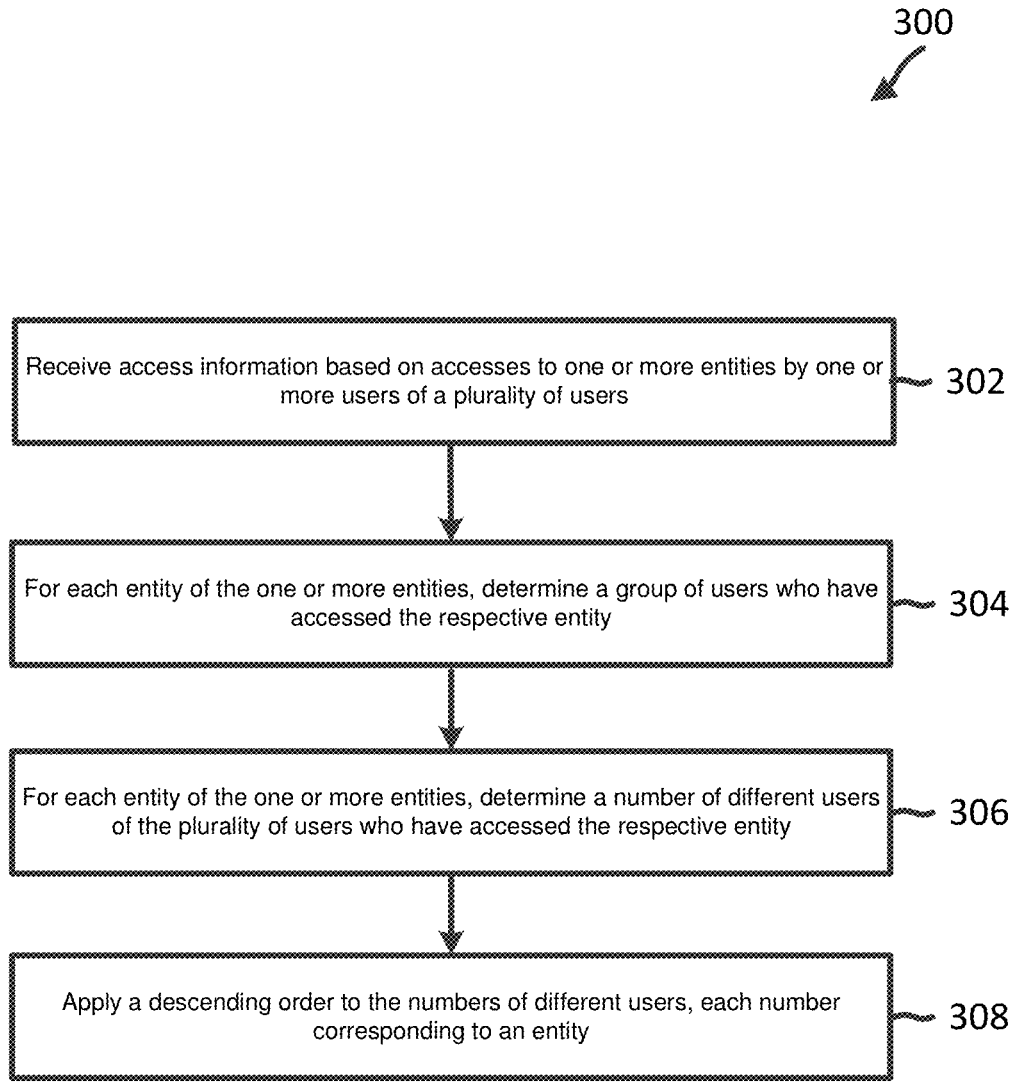
FIG. 3 is a flow diagram of a method of determining users who have accessed one or more entities according to aspects of the present disclosure.

FIG. 3 is a flow diagram of a method 300 of determining users who have accessed one or more entities according to aspects of the present disclosure. Steps of the method 300 can be executed by a computing device (e.g., a processor, processing circuit, and/or other suitable component) or other suitable means for performing the steps. For example, the community detection system 210 may utilize one or more components to execute the steps of method 300. As illustrated, the method 300 includes a number of enumerated steps, but embodiments of the method 300 may include additional steps before, after, and in between the enumerated steps. In some embodiments, one or more of the enumerated steps may be omitted or performed in a different order.

Figure 4:
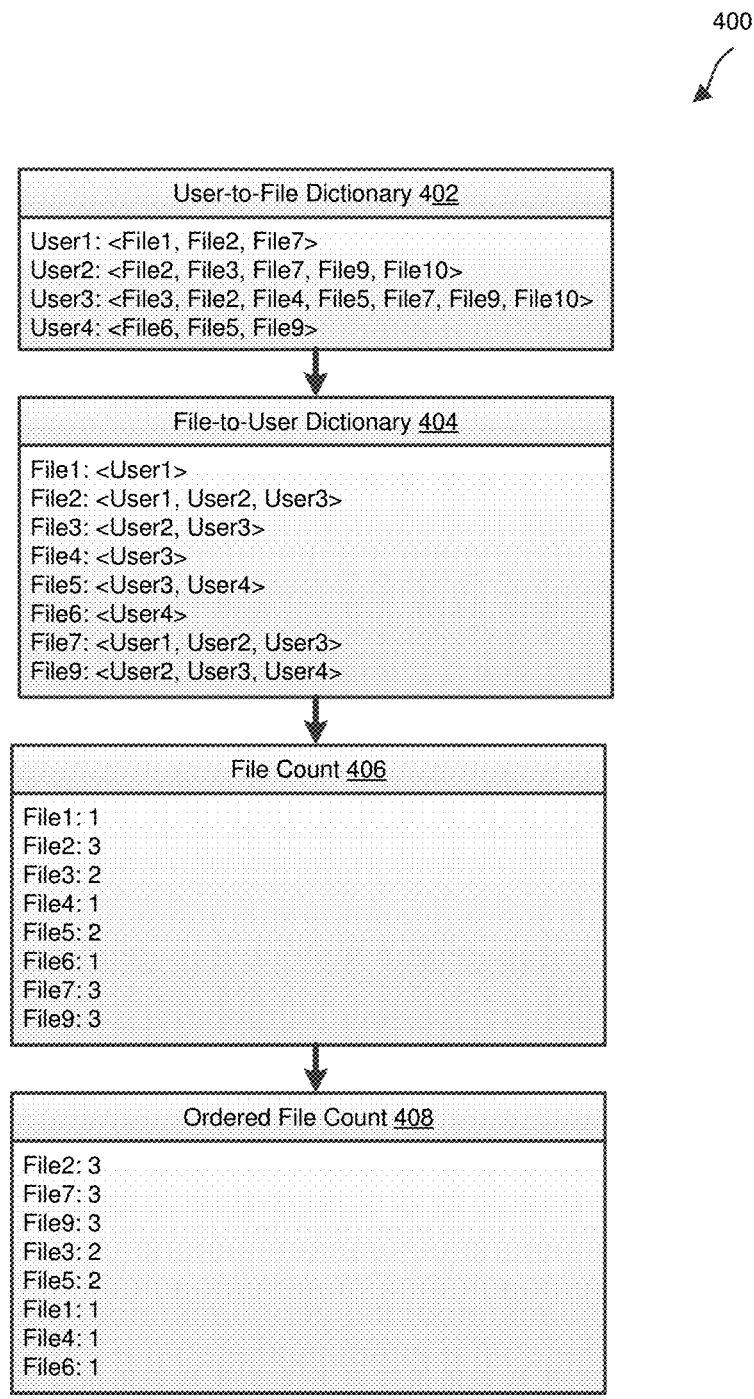
FIG. 4 is a diagram showing a user-to-file dictionary, a file-to-user dictionary, a file count, and an ordered file count that may be generated according to aspects of the present disclosure.

To aid in understanding aspects of the method 300, FIG. 4 will be discussed in relation to FIG. 3 and FIG. 5. FIG. 4 is a diagram 400 showing a user-to-file dictionary 402, a file-to-user dictionary 404, a file count 406, and an ordered file count 408 that may be generated in accordance with the method 300. Although the description related to FIG. 4 discusses the entities as being files, this is not intended to be limiting but rather by way of example; an entity may be any arbitrary unit of data (e.g., an object, a directory, a set of blocks, etc.). Additionally, the method 300 may be suitable for different domains that form communities based on a set of attributes. Forming communities based on common entities accessed by users may be used in a variety of further contexts to the examples discussed herein, including in social circles, on common movies, albums, restaurants, etc.

Referring to block 302 of FIG. 3, the community detection system 210 (e.g., via the event processor 214) receives access information based on accesses of one or more entities by one or more users of a plurality of users. The access information may include one or more event notifications based on accesses of the one or more entities by the plurality of users. Additionally, the access information may correspond to a time-period (e.g., 7 days).

Referring to block 304 of FIG. 3, for each entity of the one or more entities, the community detection system 210 (e.g., via the event processor 214) determines a group of users who have accessed the respective entity. This is illustrated in FIG. 4 with respect to the user-to-file dictionary 402. In FIG. 4, the event processor 214 may generate a user-to-file dictionary 402 including one or more entries, each entry indicating a group of entities accessed by a user of the plurality of users. As show in the user-to-file dictionary 402, User1 has accessed File1, File2, and File7; User2 has accessed File2, File3, File7, File9, and File10; User3 has accessed File3, File2, File4, File5, File7, File9, and File10; and User4 has accessed File6, File5, and File9.

Continuing with reference to FIG. 4, the event processor 214 may generate, based on the user-to-file dictionary 402, a file-to-user dictionary 404. The file-to-user dictionary 404 includes one or more entries, each entry indicating which users accessed the respective entity. As shown in the file-to-user dictionary 404, File1 has been accessed by User1; File2 has been accessed by User1, User2, and User3; File3 has been accessed by User2 and User3; File4 has been accessed by User3; File5 has been accessed by User3 and User4; File6 has been accessed by User4; File7 has been accessed by User1, User2, and User3; and File9 has been accessed by User2, User3, and User4. While FIG. 4 illustrates that the file-to-user dictionary 404 is formed from the user-to-file dictionary 402, in other embodiments, this may be reversed, or the event processor 214 generates the file-to-user dictionary 404 without generating the user-to-file dictionary 402.

Referring to block 306 of FIG. 3, for each entity of the one or more entities, the community detection system 210 (e.g., via the event processor 214) determines a number of different users of the plurality of users who have accessed the respective entity. For example, this may be based on the file-to-user dictionary 404 and/or the user-to-file dictionary 402 illustrated in FIG. 4. In FIG. 4, the event processor 214 generates the file count 406 based on the access information (e.g., based on the user-to-file dictionary 402 and/or the file-to-user dictionary 404). In the example illustrated in FIG. 4, the file count 406 specifies that File1 has been accessed by a single user; File2 has been accessed by three users; File3 has been accessed by two users; File4 has been accessed by a single user; File5 has been accessed by two users; File6 has been accessed by a single user; File7 has been accessed by three users; and File9 has been accessed by three users. In an example, the file count 406 includes {File1(1), File2(2), File3(2), File4(1), File5(2), File6(1), File7(3), and File9(3)}.

Referring to block 308 of FIG. 3, the community detection system 210 (e.g., via the event processor 214) applies a descending order to the numbers of different users, e.g. as illustrated with file count 406 in the example of FIG. 4, each number corresponding to an entity. In FIG. 4, the event processor 214 applies a descending order to the number of different users in the file count 406 to generate an ordered file count 408. In an example, the ordered file count 408 includes {File2(3), File7(3), File9(3), File3(2), File5(2), File1(1), File4(1), and File6(1)}. With this information resulting from the method 300, according to aspects of the present disclosure communities may be formed based on a common set of attributes (e.g., entities accessed by users).

Figure 5:
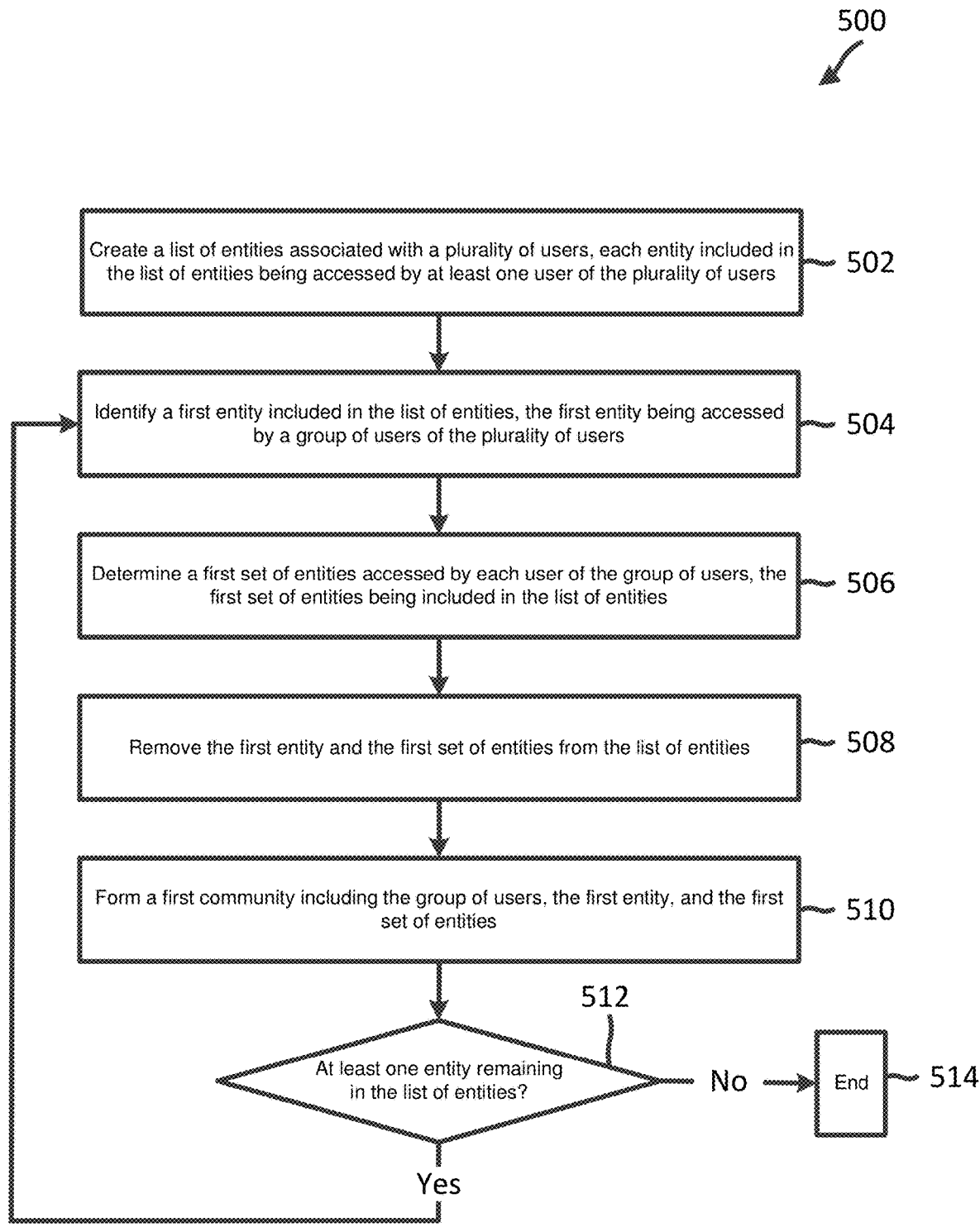
FIG. 5 is a flow diagram of a method of forming communities based on a common set of attributes according to aspects of the present disclosure.

This is illustrated, for example, in FIG. 5. FIG. 5 is a flow diagram of a method 500 of forming communities based on a common set of attributes according to aspects of the present disclosure. Steps of the method 500 can be executed by a computing device (e.g., a processor, processing circuit, and/or other suitable component) or other suitable means for performing the steps. For example, the community detection system 210 may utilize one or more components to execute the steps of method 500. As illustrated, the method 500 includes a number of enumerated steps, but embodiments of the method 500 may include additional steps before, after, and in between the enumerated steps. In some embodiments, one or more of the enumerated steps may be omitted or performed in a different order. Additionally, the method 500 may be suitable for different domains that form communities based on a set of attributes. Forming communities based on common entities accessed by users may be used in a variety of further contexts to the examples discussed herein, including in social circles, on common movies, albums, restaurants, etc.

Referring to block 502 of FIG. 5, the community detection system 210 (e.g., via the community formation engine 216) creates a list of entities associated with a plurality of users, each entity included in the list of entities being accessed by at least one user of the plurality of users. Referring to FIG. 4, the community formation engine 216 may create a list of entities including File1, File2, File3, File4, File5, File6, File7, and File9. The community formation engine 216 may create the list of entities based on the same order as the entities in the ordered file count 408, resulting from block 308 of method 300. For example, the list of entities includes {File2, File7, File9, File3, File5, File1, File4, and File6}.

Referring to block 504 of FIG. 5, the community detection system 210 (e.g., via the community formation engine 216) identifies an anchor entity included in the list of entities, the anchor entity being accessed by a group of users of the plurality of users. In an example, the anchor entity has the greatest number of accesses. In keeping with the above example, the community formation engine 216 may identify File2, which is the first entity in the list of entities, as being the anchor entity. Additionally, File2 has been accessed by a group of users {User1, User2, and User 3}, as shown in the file-to-user dictionary 404 in FIG. 4.

Referring to block 506 of FIG. 5, the community detection system 210 (e.g., via the community formation engine 216) determines a first set of entities accessed by each user of the group of users (i.e., the group of users that accessed the identified anchor entity from block 504), the first set of entities being included in the list of entities identified from block 502. For example, referring to FIG. 4, the community formation engine 216 may determine, based on the user-to-file dictionary 402 or the file-to-user dictionary 404, that File7 has been accessed by the group of users {User1, User2, and User 3}, as shown in the file-to-user dictionary 404 in FIG. 4. Accordingly, the first set of entities includes File7. No other files have been accessed by the group of users {User1, User2, and User 3} in the example illustrated in FIG. 4.

Referring to block 508 of FIG. 5, the community detection system 210 (e.g., via the community formation engine 216) removes the anchor entity and the first set of entities from the list of entities. In keeping with the above example, the community formation engine 216 removes the File2 (anchor entity) and the File7 (first set of entities) from the list of entities. After the removal, the list of entities includes {File9, File3, File5, File1, File4, and File6}.

Referring to block 510 of FIG. 5, the community detection system 210 (e.g., via the community formation engine 216) forms a first community including the group of users identified from block 504, the anchor entity identified from block 504, and the first set of entities identified from block 506. In keeping with the above example, the community formation engine 216 forms a community including the group of users {User1, User2, and User 3} and the set of entities {File2, File7} based on the example illustrated in FIG. 4. In some examples, forming the community of users may include determining which users and entities are included or excluded by the group (e.g., as in the example illustrated in FIG. 4) as well as storing data to volatile or nonvolatile memory to identify the users in entities included or excluded by the group. That data may be subsequently accessed from memory, as desired, to e.g., analyze the community or its access patterns.

Referring to block 512 of FIG. 5, the community detection system 210 (e.g., via the community formation engine 216) determines whether at least one entity remains in the list of entities. If not, the method 500 proceeds to block 514 of FIG. 5, which is an end of the method 500. If there is an entity remaining in the list of entities, the method 500 returns to block 504 of FIG. 5, in which the community formation engine 216 (e.g., via the community formation engine 216) identifies a second anchor entity included in the list of entities, the second anchor entity being accessed by a second group of users of the plurality of users. In keeping with the above example, the list of entities includes {File9, File3, File5, File1, File4, and File6}. The community formation engine 216 may identify File9 as the second anchor entity included in the list of entities. The community formation engine 216 may again execute the remaining blocks in the method 500, and repeat, until the end 514 is reached as discussed above.

Figure 6:
FIG. 6 is a diagram of forming communities according to aspects of the present disclosure.

FIG. 6 is a diagram 600 of four communities 602, 604, 606, and 608 according to aspects of the present disclosure. In an example, the community detection system 210 forms the four communities 602, 604, 606, and 608 in accordance with the access information indicated in FIG. 4 and the methods 300/500 discussed above. A community 602 may be identified by Community 602 and include a group of users {User1, User2, and User 3} and a set of entities {File2, File7}, as was discussed in relation to blocks 502, 504, 506, 508, and 510 in FIG. 5. Additionally, a community 604 may be identified by Community 604 and include a group of users {User2, User 3, and User4} and a set of entities {File9}. Additionally, a community 606 may be identified by Community 606 and include a group of users {User2, User 3} and a set of entities {File10, File3}. Additionally, a community 608 may be identified by Community 608 and include a group of users {User 3, User4} and a set of entities {File5}. The communities illustrated in FIG. 6 are for sake of ease of illustration only—more or fewer communities of varying compositions may be formed according to embodiments of the present disclosure.

In some examples, two communities can individually exist if and only if no file is common between the communities. For example, the set of entities included in the community 602 and the set of entities included in the community 604 are disjoint, and an intersection of files between the two communities is null.

In some examples, an entity-overlap parameter may be tuned to allow a degree of overlap between entities commonly accessed by users of respective communities. For sake of discussion, this entity-overlap parameter may be represented by K. If K=0, no overlap between entities commonly accessed by users of respective communities is allowed. The value of K may be fixed by empirical observation or some heuristics and act as a lever to increase or decrease the number of communities formed. Additionally, the value of K may be determined optimally based on defining and optimizing a quality measure (usually defined as) modularity for the communities generated.

With the entity-overlap parameter K, communities are formed in accordance with the following: Form communities C: {$C_1, C_2, C_3, \ldots$} such that: $U_{C_i}$: {$U_p, U_q \ldots$}. Users U part of Community $C_i$) where $F_{C_i}$: {$F_p, F_q \ldots$}. (F being entities commonly accessed by users belonging to Community $C_i$ from the number of communities in the set C), where, $F_{C_i} \cap F_{C_j}$ is Ø or $|F_{C_i} \cap F_{C_j}| < K$, depending on how much overlap the parameter K allows for between entities commonly accessed by users of respective communities.

In some examples, the community detection system 210 may include a reduction module that may be set to an ON mode or an OFF mode. If the reduction module is set to ON, the community formation engine 216 may reduce the number of communities by stricter adherence to one or more principles discussed above. If a group of users {User1, User2, User3} accessed File1, a first community may form with the group of users {User1, User2, User3} and the set of entities {File1}. If community detection system 210 determines that a proper subset {User2, User3} of the group of users {User1, User2, User3} accessed File2, the proper subset is already part of the first community and there is an overlap. In this example, the community formation engine 216 may determine to not form a second community based on the access of File2 by User2 and User3. Accordingly, one rather than two communities will form based on this example.

The use of the reduction module may serve the purpose of scale. For example, the community formation engine 216 may ignore, based on the reduction module, proper subsets with small combination of users accessing a set of entities. Continuing with the example, the proper subset {User2, User3} is already being tracked via the first community, and therefore a second community is not formed. As a result of setting the reduction module to ON, some files may therefore not be included in a community, such as in this example File2. These files will continue to be attached to the users that accessed them (thus, in this simple example, tracked via {User2, User3} of the group of users {User1, User2, User3} that accessed File2). The community detection system 210 may track individual access rates of users and the access rate of the whole community for common files.

In some examples, the community detection system 210 may alternatively or additionally determine, based on heuristics, whether to form a community. The community detection system 210 may use heuristics to reduce redundancies and the number of communities formed. In an example, n identifies the minimum number of users permissible for forming a community, and N identifies the number of users (e.g., from mappings included in the file-to-user dictionary 404) of each file under process. Additionally, k identifies the number of common files for a community to be formed (set of users) associated of each file under process (different from the entity-overlap parameter K already discussed).

In an example for sake of discussing embodiments of the present disclosure, n=3, and if N<n, the community formation engine 216 may avoid bi-user combinations (e.g., those communities having a size less than n), we can change n to 2. Equation (1) provides an example used to determine whether to form a community (1) if $k < f(N) = ([\log_n N] + 1$ if $N=n$; $[\log_n N]$ if $N>n$ and $N \leq n^2$; $\max([\log_n N], b))$ if $N>n^2$, then the community formation engine 216 does not form the community.

For example, in equation (1) when n=3 and N=3, symbolizing that the minimum permissible number of users n is set to 3, and the actual number of users N of each file under process is identified as being at 3, the function returns 2, which indicates that 3 users are commonly accessing only two files. The number of combinations may increase greatly, especially if one entity is in common. For larger sets of users, the condition does not grow with N, but grows logarithmically and is bounded by b, which is an empirically or parameter-driven upper bound on the minimum number of entities in common to be called a community. In an example, if N=81, equation (1) returns 4, indicating that at least 4 files are to be common for 81 users and that the output is bound by (it doesn't grow beyond b). In an example, b=5, which can be suitably adjusted. The equation (1) may be used to reduce long-tailed short user combinations accessing fewer common files and as well longer ones with just one file that are shared, with a determination to form a community accordingly. The community formation engine 216 may set suitable values for the parameters for N and b.

Figure 7:
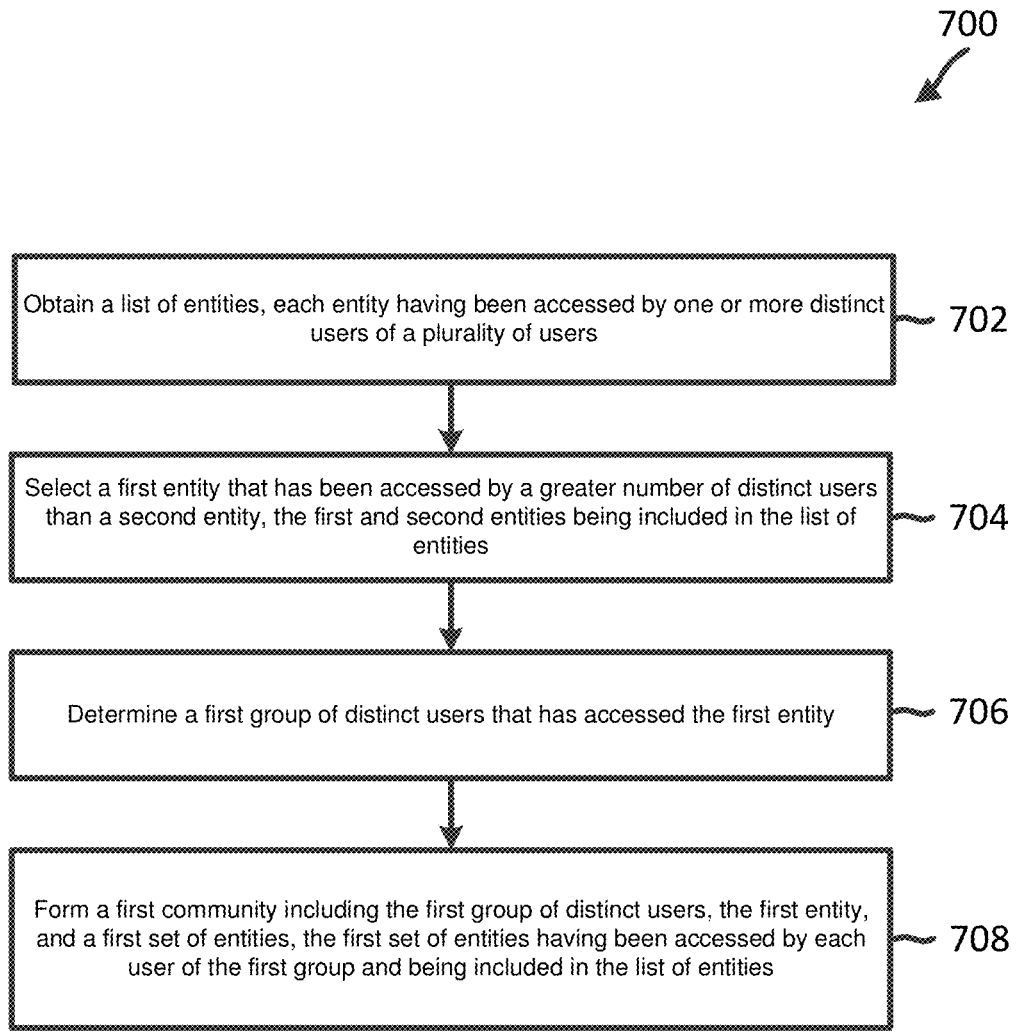
FIG. 7 is a flow diagram of a method of forming communities based on a common set of attributes according to aspects of the present disclosure.

FIG. 7 is a flow diagram of a method 700 of forming communities based on a common set of attributes according to aspects of the present disclosure. Steps of the method 700 can be executed by a computing device (e.g., a processor, processing circuit, and/or other suitable component) or other suitable means for performing the steps. For example, the community detection system 210 may utilize one or more components to execute the steps of method 700. As illustrated, the method 700 includes a number of enumerated steps, but embodiments of the method 700 may include additional steps before, after, and in between the enumerated steps. In some embodiments, one or more of the enumerated steps may be omitted or performed in a different order. Additionally, the method 700 may be suitable for different domains that form communities based on a set of attributes. Forming communities based on common entities accessed by users may be used in a variety of further contexts to the examples discussed herein, including in social circles, on common movies, albums, restaurants, etc.

Referring to block 702 of FIG. 7, the community detection system 210 (e.g., via the community formation engine 216) obtains a list of entities, each entity having been accessed by one or more distinct users of a plurality of users. Referring to block 704 of FIG. 7, the community detection system 210 (e.g., via the community formation engine 216) selects a first entity that has been accessed by a greater number of distinct users than a second entity, the first and second entities being included in the list of entities. Referring to block 706 of FIG. 7, the community detection system 210 (e.g., via the community formation engine 216) determines a first group of distinct users that has accessed the first entity.

Referring to block 708 of FIG. 7, the community detection system 210 (e.g., via the community formation engine 216) forms a first community including the first group of distinct users, the first entity, and a first set of entities, the first set of entities having been accessed by each user of the first group and being included in the list of entities. In some examples, forming the community of users may include determining which users and entities are included or excluded by the group (e.g., as in the example illustrated in FIG. 4) as well as storing data to volatile or nonvolatile memory to identify the users in entities included or excluded by the group. That data may be subsequently accessed from memory, as desired, to e.g., analyze the community or its access patterns.

Although the disclosure may provide examples of file accesses for anomaly detection (e.g., file access rate), it should be understood that other and/or additional file operations (e.g., file deletion, file modification, etc.) are within the scope of the disclosure.

The present embodiments can take the form of an entirely hardware embodiment, an entirely software embodiment, or an embodiment containing both hardware and software elements. Accordingly, it is understood that any operation of the computing systems of computing architecture 100 may be implemented by the respective computing system using corresponding instructions stored on or in a non-transitory computer readable medium accessible by the processing system. For the purposes of this description, a tangible computer-usable or computer-readable medium can be any apparatus that can store the program for use by or in connection with the instruction execution system, apparatus, or device. The medium may include non-volatile memory including magnetic storage, solid-state storage, optical storage, cache memory, and Random Access Memory (RAM).

Thus, the present disclosure provides a system, method, and machine-readable storage medium for forming a community based on a common set of attributes. In some embodiments, the method includes creating a list of entities associated with a plurality of users, each entity included in the list of entities being accessed by at least one user of the plurality of users. The method also includes identifying an anchor entity included in the list of entities, the anchor entity being accessed by a group of users of the plurality of users. The method further includes determining a first set of entities accessed by each user of the group of users, the first set of entities being included in the list of entities. The method also includes removing the anchor entity and the first set of entities from the list of entities. The method further includes forming a first community including the group of users, the anchor entity, and the first set of entities.

In yet further embodiments, the non-transitory machine-readable medium has instructions for performing the method of forming a community based on a common set of attributes, including machine executable code, which when executed by at least one machine, causes the machine to: create a list of entities associated with a plurality of users, each entity included in the list of entities being accessed by at least one user of the plurality of users; identify an anchor entity included in the list of entities, the anchor entity being accessed by a group of users of the plurality of users; determine a first set of entities accessed by each user of the group of users, the first set of entities being included in the list of entities; remove the anchor entity and the first set of entities from the list of entities; and form a first community including the group of users, the anchor entity, and the first set of entities.

In yet further embodiments, the computing device includes a memory containing a machine-readable medium comprising machine executable code having stored thereon instructions for performing a method of forming a community based on a common set of attributes and a processor coupled to the memory. The processor is configured to execute the machine executable code to: create a list of entities associated with a plurality of users, each entity included in the list of entities being accessed by at least one user of the plurality of users; identify an anchor entity included in the list of entities, the anchor entity being accessed by a group of users of the plurality of users; determine a first set of entities accessed by each user of the group of users, the first set of entities being included in the list of entities; remove the anchor entity and the first set of entities from the list of entities; and form a first community including the group of users, the anchor entity, and the first set of entities.

In yet further embodiments, a method includes creating, by a storage system, a list of entities associated with a plurality of users, each entity included in the list of entities being accessed by a user of the plurality of users; identifying, by the storage system, a first entity included in the list of entities, the first entity being accessed by a group of users of the plurality of users; determining, by the storage system, a first set of entities accessed by each user of the group of users, the first set of entities being included in the list of entities; removing, by the storage system, the first entity and the first set of entities from the list of entities; and forming, by the storage system, a first community including the group of users, the first entity, and the first set of entities.

In yet further embodiments, a non-transitory machine-readable medium having stored thereon instructions for performing a method, including machine executable code which when executed by at least one machine, causes the machine to: obtain, by a storage system, a list of entities, each entity having been accessed by one or more distinct users of a plurality of users; select, by the storage system, a first entity that has been accessed by a greater number of distinct users than a second entity, the first and second entities being included in the list of entities; determine, by the storage system, a group of distinct users that has accessed the first entity; and form a first community including the group of distinct users, the first entity, and a first set of entities, the first set of entities having been accessed by each user of the group and being included in the list of entities.

In yet further embodiments, a computing device includes: a memory containing a machine-readable medium including machine executable code having stored thereon instructions for performing a method of forming communities; and a processor coupled to the memory, the processor configured to execute the machine executable code to: obtain, by a storage system, a list of entities including a first entity and a second entity, the first entity having been accessed by a first group of distinct users, and the second entity having been accessed by a second group of distinct users; form, by the storage system, a first community including the first entity, the first group of distinct users, and a first set of entities if a first number of users in the first group is greater than a second number of users in the second group, the first set of entities having been accessed by each user of the first group and being included in the list of entities; and form, by the storage system, a second community including the second entity, the second group of distinct users, and a second set of entities if the second number is greater than the first number, the second set of entities having been accessed by each user of the second group and being included in the list of entities.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, comprising:
   collecting, by a storage system, access data of a plurality of entities by a plurality of users across one or more storage devices of the storage system, each entity from the plurality of entities comprising an object, a file, a directory, or a set of blocks;
   creating, by the storage system, a list of entities from the plurality of entities, each entity included in the list of entities being previously stored on the storage system and accessed by a user of the plurality of users;
   ordering, by the storage system, the list of entities in descending order based on a number of distinct users that have accessed one or more entities from among the list of entities, each entity from among the list of entities having a respective number of distinct users;
   selecting, by the storage system, an entity from among the list of entities as a first anchor entity that has a highest number of distinct users from among the respective numbers of distinct users corresponding to remaining entities in the ordered list of entities, the highest number of distinct users being a group of users from among the plurality of users;
   determining, by the storage system, a first subset of entities from among the list of entities, each entity of the first subset of entities having been accessed by each distinct user of the group of users;
   removing, by the storage system, the first anchor entity and the first subset of entities from the list of entities;
   forming, by the storage system based on the selecting and the determining, a first community including the group of users that have accessed the first anchor entity and the first subset of entities, the first anchor entity, and the first subset of entities, the first community providing a relationship between the group of users and the first anchor entity and the first subset of entities; and
   using, by the storage system, the first community as a baseline for insight into activity of one or more users from among the group of users in the first community with respect to the first anchor entity and the first subset of entities.

2. The method of claim 1, further comprising:
   determining, by the storage system after the removing, that one or more entities remains in the ordered list of entities; and
   removing, by the storage system in another iteration through the ordered list of entities based on the determining that one or more entities remains, a second anchor entity and a second subset of entities from the ordered list of entities, the second anchor entity and the second subset of entities being accessed by a second group of users of the plurality of users.

3. The method of claim 1, further comprising:
   forming a second community including a second group of users, a second anchor entity, and a second subset of entities, the second anchor entity and the second subset of entities being included in the ordered list of entities and being accessed by the second group of users of the plurality of users.

4. The method of claim 1, further comprising:
   forming a second community including a second group of users, a second anchor entity, and a second subset of entities, the second anchor entity and the second subset of entities being included in the ordered list of entities and being accessed by the second group of users of the plurality of users, wherein at least one user from the plurality of users is included in the first and the second communities.

5. The method of claim 1, further comprising:
   forming a second community including a second group of users, a second anchor entity, and a second subset of entities, the second anchor entity and the second subset of entities being included in the ordered list of entities and being accessed by the second group of users of the plurality of users, wherein the first subset of entities and the second subset of entities are disjoint.

6. The method of claim 1, further comprising:
in response to a determination to form a second community based on an entity-overlap parameter, forming the second community including a second anchor entity, a second subset of entities, and a second group of users of the plurality of users, the second anchor entity and the second subset of entities being included in the ordered list of entities and being accessed by the second group of users.

7. The method of claim 1, further comprising:
in response to a determination to form a second community based on a reduction module setting, forming the second community including a second anchor entity, a second subset of entities, and a second group of users of the plurality of users, the second anchor entity and the second subset of entities being included in the ordered list of entities and being accessed by the second group of users.

8. The method of claim 1, further comprising:
in response to a determination to form a second community based on a heuristic, forming the second community including a second anchor entity, a second subset of entities, and a second group of users of the plurality of users, the second anchor entity and the second subset of entities being included in the ordered list of entities and being accessed by the second group of users.

9. The method of claim 1, wherein the using further comprises:
determining, by the storage system, that access behavior by a user belonging to the first community is suspicious based on a disproportionate increase in access rate by the user relative to access rates of other users belonging to the first community; and
determining, by the storage system, that the access behavior by the user is not suspicious based on a proportionate increase in the access rate by the user relative to the access rates of the other users.

10. A non-transitory machine-readable medium having stored thereon instructions for performing a method, comprising machine executable code which when executed by at least one machine, causes the machine to:
obtain, by a storage system, a list of entities, each entity having been accessed by one or more distinct users of a plurality of users, each entity included in the list of entities being previously stored on the storage system and comprising an object, a file, a directory, or a set of blocks;
order, by the storage system, the list of entities in descending order based on a number of distinct users that have accessed one or more entities from among the list of entities, each entity from among the list of entities having a respective number of distinct users;
select, by the storage system, a first anchor entity from the ordered list of entities, the first anchor entity having been accessed by a greater number of distinct users than remaining entities in the ordered list of entities;
determine, by the storage system, a group of distinct users that has accessed the first anchor entity based on the number of distinct users that have accessed the first anchor entity;
determine, by the storage system, a first subset of entities from among the list of entities, each entity of the first subset of entities having been accessed by each user of the group of distinct users;
remove, by the storage system, the first anchor entity and the first subset of entities from the list of entities;

form, by the storage system based on the selection of the first anchor entity, the determination of the group of distinct users, and the determination of the first subset of entities, a first community including the group of distinct users that have accessed the first anchor entity and the first subset of entities, the first anchor entity, and the first subset of entities, the first community providing a relationship between the group of distinct users and the first anchor entity and the first subset of entities; and
use, by the storage system, the first community as a baseline for insight into activity of one or more users from among the group of distinct users in the first community with respect to the first anchor entity and the first subset of entities.

11. The non-transitory machine-readable medium of claim 10, further comprising machine executable code which causes the machine to:
select, in another iteration through the ordered list of entities based on one or more entities remaining in the ordered list of entities, a second anchor entity having been accessed by a greater number of distinct users than remaining entities in the ordered list of entities;
determine a second group of distinct users that has accessed the second anchor entity, and determine a second subset of entities from the ordered list of entities that have each been accessed by each user of the second group of distinct users; and
form a second community including the second group of distinct users, the second anchor entity, and the second subset of entities.

12. The non-transitory machine-readable medium of claim 11, further comprising machine executable code which causes the machine to:
determine to form the second community based on an entity-overlap parameter.

13. The non-transitory machine-readable medium of claim 11, further comprising machine executable code which causes the machine to:
determine to form the second community based on a heuristic.

14. The non-transitory machine-readable medium of claim 11, wherein the first subset of entities and the second subset of entities are disjoint to each other.

15. The non-transitory machine-readable medium of claim 10, further comprising machine executable code which causes the machine, as part of the use, to:
determine that access behavior by a user belonging to the first community is suspicious based on a disproportionate increase in access rate by the user relative to access rates of other users belonging to the first community; and
determine that the access behavior by the user is not suspicious based on a proportionate increase in the access rate by the user relative to the access rates of the other users.

16. A computing device comprising:
a memory containing a machine-readable medium comprising machine executable code having stored thereon instructions for performing a method of forming communities; and
a processor coupled to the memory, the processor configured to execute the machine executable code to:
obtain, by the computing device, a list of entities including a first entity and a second entity, the first entity having been accessed by a first group of distinct users, and the second entity having been accessed by a second group of distinct users, each entity in the list of entities being previously stored on the storage system;

order, by the computing device, the first entity and the second entity in the list of entities based on a first number of distinct users for the first group and a second number of distinct users for the second group;

in response to the first number being greater than the second number:

select, by the computing device, the first entity as a first anchor entity;

determine, by the computing device, a first subset of entities, each entity of the first subset of entities having been accessed by each distinct user of the first group of distinct users;

remove, by the computing device, the first entity and the first subset of entities from the list of entities;

form, by computing device, a first community including the first anchor entity, the first group of distinct users that have accessed the first anchor entity and the first subset of entities, and the first subset of entities, the first community providing a relationship between the first group of distinct users and the first anchor entity and the first subset of entities; and use the first community as a baseline for insight into activity of one or more users from among the first group of distinct users in the first community with respect to the first anchor entity and the first subset of entities; and in response to the second number being greater than the first number:

select, by the computing device, the second entity as a second anchor entity;

determine, by the computing device, a second subset of entities, each entity of the second subset of entities having been accessed by each distinct user of the second group of distinct users;

remove, by the computing device, the second entity and the second subset of entities from the list of entities;

form, by computing device, a second community including the second anchor entity, the second group of distinct users that have accessed the second anchor entity and the second subset of entities, and the second subset of entities, the second community providing a relationship between the second group of distinct users and the second anchor entity and the second subset of entities; and use the second community as a baseline for insight into activity of one or more users from among the second group of distinct users in the second community with respect to the second anchor entity and the second subset of entities.

17. The computing device of claim 16, wherein the processor is further configured to execute the machine executable code, as part of the use, to:

determine that access behavior by a user belonging to a community from among the first and second communities is suspicious based on a disproportionate increase in access rate by the user relative to access rates of other users belonging to the same community; and determine that the access behavior by the user is not suspicious based on a proportionate increase in the access rate by the user relative to the access rates of the other users.

* * * * *